US007571706B2

(12) United States Patent
Ichikawa et al.

(10) Patent No.: US 7,571,706 B2
(45) Date of Patent: Aug. 11, 2009

(54) NEEDLE ROLLER BEARING AND ITS MANUFACTURING METHOD

(75) Inventors: Kenichi Ichikawa, Iwata (JP); Shinya Oooka, Fukuroi (JP)

(73) Assignee: NTN Corporation, Osaka (JP)

( * ) Notice: Subject to any disclaimer, the term of this patent is extended or adjusted under 35 U.S.C. 154(b) by 69 days.

(21) Appl. No.: 11/477,498

(22) Filed: Jun. 30, 2006

(65) Prior Publication Data

US 2007/0068338 A1 Mar. 29, 2007

(30) Foreign Application Priority Data

| | | | |
|---|---|---|---|
| Jul. 4, 2005 | (JP) | ............................ | 2005-194897 |
| Jul. 5, 2005 | (JP) | ............................ | 2005-196850 |
| Jul. 13, 2005 | (JP) | ............................ | 2005-204630 |
| Sep. 15, 2005 | (JP) | ............................ | 2005-268038 |

(51) Int. Cl.
*F02B 75/32* (2006.01)

(52) U.S. Cl. ................... 123/197.3; 74/579 E; 384/572

(58) Field of Classification Search .............. 123/197.3; 74/579 E; 384/572, 575, 580
See application file for complete search history.

(56) References Cited

U.S. PATENT DOCUMENTS

| | | | |
|---|---|---|---|
| 3,080,639 A | 3/1963 | Maurizi | |
| 3,307,892 A * | 3/1967 | Eckstein | 384/572 |
| 5,391,005 A * | 2/1995 | Alling | 384/575 |
| 6,007,254 A * | 12/1999 | Fujioka et al. | 384/572 |
| 6,648,519 B2 * | 11/2003 | Fugel et al. | 384/580 |

FOREIGN PATENT DOCUMENTS

| | | |
|---|---|---|
| DE | 44 42 269 A1 | 6/1995 |
| DE | 196 54 584 A1 | 7/1997 |
| EP | 342 611 | 11/1989 |
| JP | 49-68147 | 7/1974 |
| JP | 7332371 | 12/1995 |
| JP | 2004-293627 | 10/2004 |
| JP | 2004324760 | 11/2004 |
| JP | 2004324760 A * | 11/2004 |
| JP | 2005098368 | 4/2005 |

* cited by examiner

*Primary Examiner*—Noah Kamen
(74) *Attorney, Agent, or Firm*—Clark & Brody

(57) ABSTRACT

A needle roller bearing comprises a plurality of needle rollers and a retainer. The retainer includes a pair of annular parts and pillar parts connecting the pair of annular parts so as to form pockets in which the needle rollers are housed. A sidewall surface of the pillar part has a sheared surface punched by a punching blade so that the pockets are formed, and a fractured surface fractured by a material pressed by the punching blade. The needle roller is guided by the sheared surface.

7 Claims, 12 Drawing Sheets

NEEDLE ROLLER BEARING AND ITS MANUFACTURING METHOD

BACKGROUND OF THE INVENTION

1. Field of the Invention

The present invention relates to a needle roller bearing, a retainer of the needle roller bearing and their manufacturing methods. Furthermore, the present invention relates to various kinds of structures comprising the needle roller bearing.

2. Description of the Background Art

A 2-cycle engine having a small engine capacity is used in a utility engine in an agricultural machine and the like. A technique regarding such 2-cycle engine is disclosed in Japanese Unexamined Patent Publication No. 7-332371.

FIG. 14 is a longitudinal sectional view showing a 2-cycle engine using needle roller bearings at a small end part and a large end part of a connecting rod. Referring to FIG. 14, the 2-cycle engine comprises a crankshaft 103 that outputs a rotary motion, a piston 105 that conducts a linear reciprocating movement by means of combustion of mixture gas, and a connecting rod 104 connecting the crankshaft 103 to the piston 105 to convert the linear reciprocating motion to the rotary motion. The crankshaft 103 rotates around a rotation center shaft 111 and a balance weight 112 maintains the rotation balance.

The connecting rod 104 comprises a large end part 115 at a lower part of a linear rod body and a small end part 116 at an upper part thereof. The crankshaft 103 is rotatably supported by the large end part 115 of the connecting rod 104 and a piston pin 114 connecting the piston 105 to the connecting rod 104 is rotatably supported by the small end part 116 of the connecting rod 104 through each roller bearing 106.

A mixture of gasoline and lubrication oil is sent from an inlet 107 to a crank chamber 102 and then sent to a combustion chamber 109 provided above a cylinder 101 according to a vertical movement of the piston 105 and burned. Exhaust gas after burning is exhausted from an outlet 108.

A shell type needle roller bearing which can receive high load and has highly rigidity in spite of its small bearing projected area is used as the above roller bearings which are provided at the small end part and the large end part of the connecting rod and support the piston pin and the crankshaft. Here, the shell type needle roller bearing comprises a shell type outer ring formed by processing a steel plate in a drawing process and the like, needle rollers, and a retainer arranged along an inner diameter surface of the shell type outer ring. Pockets for holding the needle rollers are provided in the retainer and pillar parts positioned between the adjacent pockets retain intervals of the needle rollers.

Here, a manufacturing method of the retainer contained in the above shell type needle roller bearing will be briefly described. First, a band steel which is a material of the retainer is punched out to form pocket holes having a size in which the rollers can be held. Then, the band steel is pressed so that its sectional configuration may be in the form of a V shape. After the pressing process, it is cut to a length that is equal to a circumferential length of the retainer, the cut band steel is bent and formed into a cylindrical shape, end surfaces of the bent steel plate are bonded by welding and the like, and a heat treatment process is performed for it, whereby the retainer is manufactured.

Here, when the band steel is pressed to be formed into the V shape in section, since a sectional height in a diameter direction can be ensured, the following effect is provided. FIGS. 15A and 15B are sectional views showing the band steel in the diameter direction before and after the band steel is formed into the cylindrical shape after the pressing and cutting processes, respectively. Since an interval of pillar parts 126 on an inner diameter surface 132 before the retainer is formed into the cylindrical shape (FIG. 15A) becomes small after the retainer is formed into the cylindrical shape (FIG. 15B), a needle roller 123 retained in the pocket can be prevented from falling off toward the inner diameter surface 132. In this case, when a component to prevent the roller from escaping is further provided on the side of an outer diameter surface 131 of the pillar part 126, the needle roller 123 is prevented from escaping toward the outer diameter surface 131.

In addition, FIG. 16 is a view showing a state in which a retainer 124 retaining the needle rollers 123 is incorporated in an outer ring 122 and a shaft 121. By the pressing process performed to form the sectional configuration into the V shape, the needle roller 123 can be guided in the vicinity of a PCD (Pitch Circle Diameter) 125 in which the movement of the needle roller 123 can be most stably controlled.

In addition, a retainer of a needle roller bearing having the same configuration as that of the retainer manufactured by the above steps is disclosed in Japanese Unexamined Patent Publication 2005-98368.

In the above pocket punching-out process, the material of the retainer is punched out by a punch having a punching blade such that a pocket configuration is pressed with the blade and punched out. At this time, in a sidewall surface of the punched pocket, that is, a sidewall surface of the pillar part positioned between the pockets, a sheared surface and a fractured surface are generated. The sheared surface is a flat and smooth surface punched out with the punching blade of the punch and the like, and the fractured surface is a rough surface fractured by a material pressed by the blade.

Here, in the pocket punching-out process, when the pocket is punched out from the side which becomes an inner diameter surface when the material is formed into the cylindrical shape, the fractured surface is positioned on the side which becomes the outer diameter surface of the sidewall surface of the pillar part.

FIG. 17 is a sectional view showing the retainer 124 in a diameter direction in the above case, and FIG. 18 is a sectional view of the retainer in an axial direction in the above case. In FIG. 18, a part surrounded by a dotted line is the needle roller 123 held in the pocket of the retainer 124 and a one-dot chain line shows the PCD 125. Referring to FIGS. 17 and 18, when the pocket is punched out from a direction of an arrow X in the drawings, which is the side of the inner diameter surface 132, a sheared surface 128 is formed on the side of the inner diameter surface 132 of a sidewall surface 130 and a fractured surface 129 is formed on the side of the outer diameter surface 131 of the sidewall surface 130. Here, since the retainer 124 is pressed into the V shape in section, when the needle roller 123 is held therein, the fractured surface 129 is positioned in the center part of the sidewall surface 130 in the vicinity of the PCD 125, and the sheared surface 128 is positioned at ends of the sidewall surface 130 in the vicinity of the PCD 125.

A configuration curve 134 of the sidewall surface 130 along the PCD 125 in this case is shown in FIG. 19 together with an outline 133 of the needle roller 123. Referring to FIG. 19, the center of the sidewall surface 130 is the fractured surface 129 and end parts thereof are the sheared surface 128. Thus, the configuration curve 134 is recessed to the center part with respect to the outline 133, so that the needle roller 123 is in contact with the sheared surface 128 at the end parts of the sidewall surface 130 when guided.

However, since the end part of the needle roller 123 is a chamfered part and the end part of the sidewall surface 130 does not have a configuration to follow the outline 133 of the needle roller 123, they cannot be appropriately in contact with each other, so that the needle roller 123 cannot be stably guided. When the roller bearing comprising such retainer is used in the piston pin supporting structure of the 2-cycle engine and the like, the roller is skewed and seizing could occur.

A shell type roller bearing for a laminated connecting rod has the similar problems.

The connecting rod used in the engine is manufactured by forging, sintering or restraint pressure forming a steel rod material or a plate material. As another method, the connecting rod is punched out from a steel plate by a pressing process. When the connecting rod is manufactured by the forging or sintering process, since many manufacturing steps are required, it is difficult to reduce its cost. Furthermore, when a hole and the like is formed in the connecting rod, since a grinding process and the like is to be performed, the number of steps is further increased.

As a connecting rod assembly which can be easily and inexpensively manufactured, prevent a bearing and the like to be set in a large end part or a small end part from being skewed, and improve bending strength and buckling strength, there is proposed an assembly in which connecting rod division parts having a large end part, a small end part and a rod part individually are laminated and the laminated connecting rod division parts are integrally fixed so that the adjacent connecting rod division parts are connected by engaging a connecting projection formed in the rod part by a pressing process with a recess formed on a back surface of the projection or with a through hole formed separately from the projection (Japanese Unexamined Patent Publication No. 2004-324760, for example).

According to this construction, since the connecting rod division parts are laminated, even when an inner diameter surface of the large end part or the small end part of the connecting rod division part is skewed, the skew of an inner diameter surface of a large end or a small end of the laminated connecting rod can be eliminated. For example, when each of the connecting rod division parts is normally pressed out, the large end part or the small end part of each connecting rod division part is skewed because of its fractured surface. However, since each thickness is small because of division, a level difference between a sheared surface and a fractured surface is small, and fractured surfaces are dispersed when laminated. Thus, the skew of the inner diameter surface of the large end or the small end of the laminated body can be eliminated as a whole. Therefore, when the shell type roller bearings are press fitted in the large end and the small end, the outer ring is not skewed. Thus, since each of the connecting rod division parts can be pressed out, it is not necessary to perform a post-process such as grinding or polishing for the large end part and the small end part. Thus, the connecting rod assembly can be manufactured easily and inexpensively.

Furthermore, since the laminated connecting rod division parts are connected by engaging the projection pressed in the rod part with the recess formed on the back surface of the projection, or with the through hole formed separately from the projection, they can be rigidly connected. Since the laminated connecting rod division parts are connected by means of the projection and the recess and the like at the rod part, bending strength and buckling strength at the rod part are improved. Since the projection and the recess formed on the back surface thereof are provided by the pressing process, they can be easily formed.

As a bearing in this connecting rod assembly, the shell type roller bearing comprising the shell type outer ring formed by the pressing process including the drawing step, the plurality of needle rollers arranged along the inner diameter surface of the outer ring, and the retainer retaining these needle rollers can be employed. The conventional shell type needle roller bearing has problems described with reference to FIGS. 15 to 19.

SUMMARY OF THE INVENTION

It is an object of the present invention to provide a needle roller bearing that can guide rollers stably.

It is another object of the present invention to provide a piston supporting structure of an engine comprising the above needle roller bearing.

It is still another object of the present invention to provide a crankshaft supporting structure of an engine comprising the above needle roller bearing.

It is still another object of the present invention to provide a shell type roller bearing for a laminated connecting rod and a connecting rod assembly that can prevent a roller from being skewed and running transversely using a press retainer having a simple constitution.

It is still another object of the present invention to provide a retainer of the needle roller bearing that can guide rollers stably.

It is still another object of the present invention to provide a manufacturing method of the retainer of the needle roller bearing that can guide rollers stably.

A needle roller bearing according to the present invention comprises a plurality of needle rollers and a retainer for retaining the needle rollers. The above retainer includes a pair of annular parts and pillar parts connecting the pair of annular parts so as to form pockets in which the needle rollers are housed. Here, a sidewall surface of the pillar part has a sheared surface punched by a punching blade so that the pockets are formed, and a fractured surface fractured by a material pressed by the punching blade. The above needle roller is guided by the sheared surface.

According to the above constitution, in the sidewall surface of the pillar part for guiding the roller, the roller can be guided by the flat and smooth sheared surface provided in the center and following the outline of the roller, so that the rollers can be guided stably.

Preferably, the pillar part has a configuration in which its center part is recessed toward the inside in a diameter direction, the sheared surface is positioned on the outside in the diameter direction, and the fractured surface is positioned on the inside in the diameter direction. Thus, since the sheared surface can be positioned in the vicinity of the PCD, the rollers can be guided stably.

Further preferably, a length of the sheared surface in an axial direction that guides the needle roller is not less than 60% of a length of the needle roller in the axial direction. Thus, since the large sheared surface can guide the roller, the movement of the roller can be stabled.

According to another aspect of the present invention, a retainer of a needle roller bearing retains a plurality of needle rollers. The retainer comprises a pair of annular parts and pillar parts connecting the pair of annular parts so as to form pockets in which the needle rollers are housed. The pillar part has a configuration in which its center part is recessed toward the inside in a diameter direction. Here, a sidewall surface of the pillar part has a sheared surface punched by a punching blade so that the pocket is formed, and a fractured surface fractured by a material pressed by the punching blade.

When this retainer of the needle roller bearing is used, there is provided a needle roller bearing that can guide the rollers stably.

A piston supporting structure of an engine according to the present invention comprises a piston pin for connecting the piston to a small end part of a connecting rod and a bearing for supporting the piston pin. The bearing comprises a plurality of rollers and a retainer for retaining the rollers. The retainer includes a pair of annular parts and pillar parts connecting the pair of annular parts so as to form pockets in which the needle rollers are housed. Here, a sidewall surface of the pillar part has a sheared surface punched by a punching blade so that the pocket is formed, and a fractured surface fractured by a material pressed by the punching blade, and the roller is guided by the sheared surface.

According to the above constitution, in the sidewall surface of the pillar part for guiding the roller, the roller can be guided by the flat and smooth sheared surface provided in the center and following the outline of the roller, so that the rollers can be guided stably. Therefore, when the piston pin is supported by such bearing, there can be provided a piston pin supporting structure in which the roller is prevented from being skewed and a seizing resistance property is improved.

Preferably, the pillar part has a configuration in which its center part is recessed toward the inside in a diameter direction, and the sheared surface is positioned outside in the diameter direction and the fractured surface is positioned inside in the diameter direction. Thus, since the sheared surface can be positioned in the vicinity of the PCD, the roller bearing provided in the piston pin supporting structure of the engine can guide the rollers stably.

According to still another aspect of the present invention, a crankshaft supporting structure comprises a crankshaft connected to a connecting rod for converting a linear reciprocating movement to a rotary motion and outputting a rotary movement and a bearing for supporting the crankshaft. The bearing comprises a plurality of rollers and a retainer for retaining the rollers. The retainer includes a pair of annular parts and pillar parts connecting the pair of annular parts so as to form pockets in which the needle rollers are housed. Here, a sidewall surface of the pillar part has a sheared surface punched by a punching blade so that the pocket is formed, and a fractured surface fractured by a material pressed by the punching blade, and the roller is guided by the sheared surface.

According to the above constitution, in the sidewall surface of the pillar part for guiding the roller, the roller can be guided by the flat and smooth sheared surface provided in the center and following the outline of the roller, so that the rollers can be guided stably. Therefore, when the crankshaft is supported by such bearing, there can be provided a crankshaft supporting structure in which the roller is prevented from being skewed and a seizing resistance property is improved.

Preferably, the pillar part has a configuration in which its center part is recessed toward the inside in a diameter direction, and the sheared surface is positioned outside in the diameter direction and the fractured surface is positioned inside in the diameter direction. Thus, since the sheared surface can be positioned in the vicinity of the PCD, the roller bearing provided in the crankshaft supporting structure of the engine can guide the rollers stably.

According to still another aspect of the present invention, a 2-cycle engine comprises the above piston pin supporting structure or crankshaft supporting structure.

According to the above constitution, there can be provided a 2-cycle engine in which the roller is prevented from being skewed and a seizing resistance property is improved.

A connecting rod assembly according to the present invention comprises a laminated connecting rod and a shell type roller bearing. The laminated connecting rod is laminated with plate-shaped connecting rod division parts having a large end part, a small end part and a rod part individually and connected to the adjacent connecting rod division part by engaging a connecting projection formed in the rod part by a pressing process with a recess formed on a back surface of the projection or with a through hole formed separately from the projection. The roller bearing has an outer ring, a plurality of needle rollers and a retainer for retaining the plurality of needle rollers. The outer ring of the bearing is press fitted in a bearing engagement hole in a large end or a small end of the laminated connecting rod. The retainer has a sectional configuration in which its center part in a width direction is recessed toward an inner diameter with respect to its both ends by the pressing process, and comprises a plurality of pockets provided in a circumferential direction, and pillar parts positioned between the adjacent pockets. In a part positioned on a pitch circle diameter along which the needle roller is arranged in an inner surface of the pocket in a longitudinal direction, a sheared surface is generated in the vicinity of the center of the pillar part in the longitudinal direction and a fractured surface is generated at root parts thereof.

According to this constitution, in the part of the pitch circle diameter along which the needle roller of the retainer is arranged, the sheared surface is generated in the vicinity of the center of the pillar part in the longitudinal direction and the fractured surface is formed at root parts thereof in the longitudinal direction. Therefore, for example, when it is incorporated in the connecting rod assembly of the 2 cycle engine and operated, the needle roller and the retainer are in contact with each other on a flat surface in the vicinity of the center of the pillar part in the longitudinal direction. Thus, the needle roller is prevented from being skewed and transversely running in a thrust direction. Thus, a width surface of the shell type outer ring is prevented from coming in contact with an opponent part of the engine, so that seizing of the bearing can be prevented.

According to the present invention, a length of the sheared surface in the vicinity of the center part of the pillar part in the longitudinal direction may be 60% or more of a length of the needle roller. When the sheared surface in the vicinity of the center part of the pillar part of the retainer in the longitudinal direction becomes short and the length of the contact part between the needle roller and the sheared surface of the retainer becomes short, the movement of the needle roller cannot be sufficiently controlled. However, as described above, when the length of the sheared surface in the vicinity of the center of the pillar part in the longitudinal direction is provided so as to be not less than 60% of the length of the needle roller, the contact part between the needle roller and the flat sheared surface is long, so that the movement of the needle roller can be stabled.

Furthermore, other than the above effect provided by the shell type roller bearing, there is provided the following effect.

That is, even when an inner diameter surface of the large end part or the small end part of each of the connecting rod division parts is skewed due to a pressing process, skew of an inner diameter surface of a large end or a small end of the laminated connecting rod can be eliminated. Therefore, when the outer ring of the shell type roller bearings are press fitted in the large end and the small end, the outer ring is not skewed. Thus, since a pressed-out product can be used for each of the connecting rod division parts, it is not necessary to perform a post-process such as grinding or polishing for the large end part and the small end part. Furthermore, since the laminated connecting rod division parts are connected by engaging the projection pressed in the rod part with the recess formed on the back surface of the projection, or with the through hole formed separately from the projection, they can be rigidly connected. Since the laminated connecting rod division parts are connected by the projection and the recess and the like, bending strength and buckling strength at the rod part are improved. Since the projection and the recess formed on the back surface thereof are provided by the pressing process, they can be easily formed.

Thus, with the laminated connecting rod which is an inexpensive punched-out product and the shell type bearing using an inexpensive retainer, when the connecting rod in which the shell type outer ring can be press fitted without being skewed is combined with the bearing which can prevent the roller from being skewed and running transversely, there is provided a connecting rod assembly which is inexpensive as a whole and superior in various kinds of functions.

A manufacturing method of a retainer of a needle roller bearing according to the present invention is a manufacturing method of a retainer of a needle roller bearing having a pair of annular parts and pillar parts connecting the pair of annular parts so as to form pockets in which needle rollers are housed. The manufacturing method comprises a punching step of punching out the pocket in such a manner that a side that becomes an outer diameter surface when a cylindrical surface is formed is a sheared surface punched out by a punching blade and a side that becomes an inner diameter surface is a fractured surface fractured by a material pressed by the punching blade in a sidewall of the pillar part, and a pressing step of pressing a center part of the pillar part toward a side that becomes an inner diameter side when the cylindrical surface is formed.

When the retainer of the needle roller bearing is manufactured by the above steps, since the roller can be guided on the sheared surface that is smooth and follows the outline of the roller in the center of the sidewall surface of the pillar part in the vicinity of the PCD, the roller can be guided stably.

Preferably, the pressing step in the manufacturing method is performed in such a manner that a length of the sheared surface for guiding the needle roller in an axial direction becomes not less than 60% of a length of the needle roller in the axial direction. When the retainer of the needle roller bearing is manufactured by the above step, the sheared surface that guides the roller is large, so that the movement of the roller can be controlled further stably.

According to manufacturing method of a needle roller bearing in another aspect of the present invention, needle rollers are set in pockets of the retainer of the needle roller bearing manufactured by any of the above-described methods for manufacturing the retainer of the needle roller bearing.

When the needle roller bearing is manufactured by such manufacturing method, the roller can be stably guided and a seizing resistance property can be improved.

DESCRIPTION OF THE PREFERRED EMBODIMENTS

Figure 1:
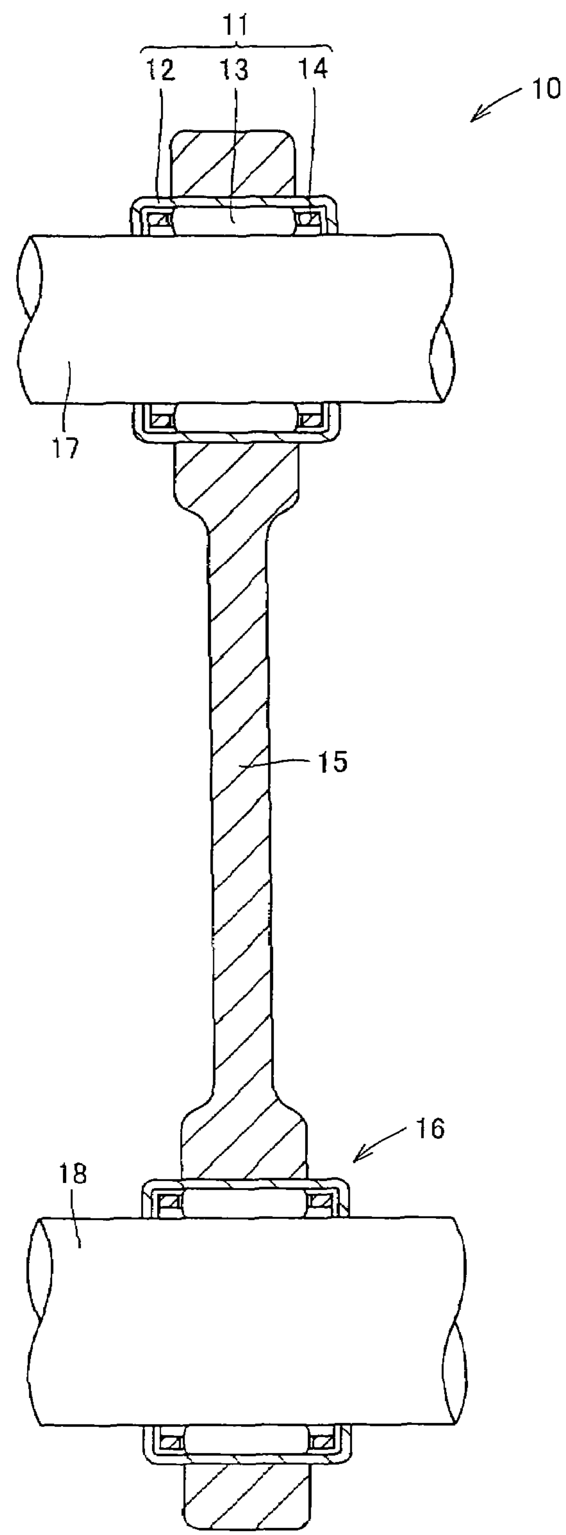
FIG. 1 is a sectional view showing an essential part of a 2-cycle engine according to one embodiment of the present invention.

Embodiments of the present invention will be described with reference to the drawings hereinafter. FIG. 1 is a sectional view showing an essential part of a 2-cycle engine according to one embodiment of the present invention. Referring to FIG. 1, a 2-cycle engine 10 comprises a piston (not shown) conducting a linear reciprocating movement by means of combustion of mixture gas, a crankshaft 18 outputting a rotary motion, and a connecting rod 15 connecting the piston to the crankshaft 18 to convert the linear reciprocating motion to the rotary motion. The piston is connected to a small end part of the connecting rod 15 through a needle roller bearing 11 having a shell type outer ring by a piston pin 17. The crankshaft 18 is connected to a large end part of the connecting rod 15 through a needle roller bearing 16 having a shell type outer ring.

The needle roller bearing 11 in which a peripheral surface of the piston pin 17 is fitted is set in an engagement hole provided at the small end part of the connecting rod 15, whereby a piston pin supporting structure is formed. Similarly, the needle roller bearing 16 in which a peripheral surface of the crankshaft 18 is fitted is set in an engagement hole provided at the large end part of the connecting rod 15, whereby a crankshaft supporting structure is formed. In addition, although the needle roller bearings 11 and 16 mounted on the small end part and the large end part of the connecting rod 15, respectively are different in size, since they have the same constitution, a description will be made of the needle roller bearing 11 hereinafter.

The needle roller bearing 11 comprises an outer ring 12, a plurality of needle rollers 13 arranged along an inner diameter surface of the outer ring 12, and a retainer 14 for retaining the needle rollers 13. The retainer 14 has a pair of annular parts positioned on both ends of the outer ring 12 and pillar parts for connecting the pair of annular parts so as to form pockets in which the needle rollers are housed.

Here, a description will be made of a manufacturing method of the retainer 14 among the components constituting the needle roller bearing 11.

Figure 2:
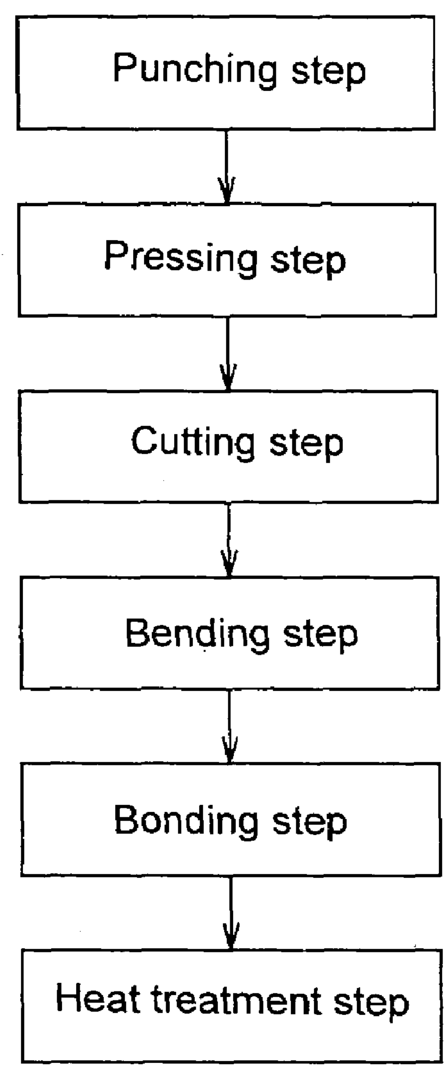
FIG. 2 is a flowchart showing manufacturing steps of a retainer of a needle roller bearing.

FIG. 2 is a flowchart showing steps of manufacturing the retainer 14 of the needle roller bearing 11 according to one embodiment of the present invention. FIG. 3 is a schematic view showing representative steps among the steps shown in FIG. 2. The manufacturing method of the retainer 14 will be described with reference to FIGS. 2 and 3.

Figure 3A:
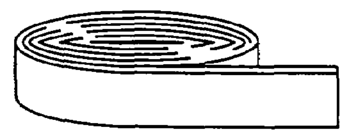
FIG. 3A is a perspective view showing a band steel which is a starting material in manufacturing the retainer.
Figure 3B:
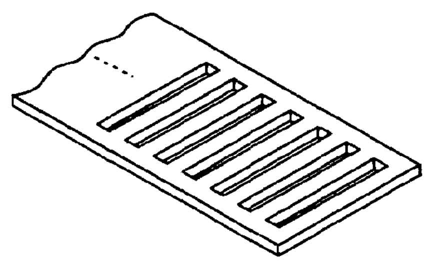
FIG. 3B is a perspective view showing a state after a step of punching out pockets.
Figure 3C:
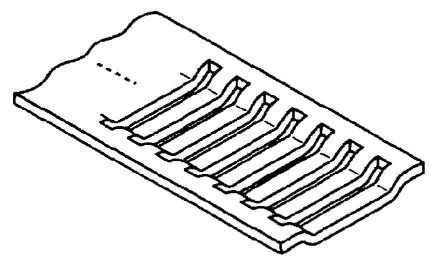
FIG. 3C is a perspective view showing a state after a pressing step.
Figure 3D:
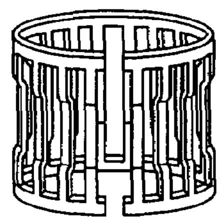
FIG. 3D is a perspective view showing a state after a bending step.

First, a steel plate that is a material of the retainer 14 in a state of a band steel (FIG. 3A) is punched to form pockets for retaining the needle rollers (FIG. 3B). This punching step is performed using a punch having a punching blade so as to press a configuration of the pocket in the band steel with a blade edge and punch it out. At this time, the punching is performed from a side which become an outer diameter surface when the steel plate is formed into a cylindrical shape at a bending step as will be described below.

Thus, in the finally manufactured retainer, a sidewall surface of the pillar part on the side of the outer diameter surface is a sheared surface and the sidewall surface of the pillar part on the side of the inner diameter surface is a fractured surface.

Subsequently, the band steel in which pockets are formed is pressed such that its sectional configuration may become a V shape at a pressing step (FIG. 3). Here, the V shape means that when the center part and the annular part of the band steel having punched pockets are formed into the cylindrical shape, a stepped part is formed in a diameter direction. This step is performed by pressing the band steel with a press from the side that becomes the outer diameter surface, toward the side that becomes the inner diameter surface later. Thus, the center of the pillar part is recessed inside in the diameter direction with respect to the annular part.

Figure 3E:
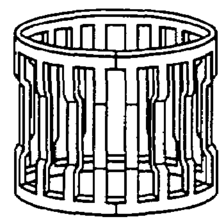
FIG. 3E is a perspective view showing a state of a final product.

Subsequently, a cutting step of cutting the band steel is performed such that a length thereof may be equal to a circumferential length of the retainer 14. Then, a bending step is performed such that the cut band steel is formed into the cylindrical shape so as to be along the inner diameter surface of the outer ring 12 (FIG. 3D) and a bonding step of bonding both end surfaces thereof is performed by welding and the like (FIG. 3E). Then, a heat treatment step such as a soft nitriding process or a carburized quenching process is performed and the retainer 14 is finally manufactured.

Then, the plurality of needle rollers 13 are set in the pockets of the retainer 14 manufactured as described above and the retainer 14 retaining the needle rollers 13 is mounted on the outer ring 12, whereby the needle roller bearing 11 is manufactured.

Figure 4:
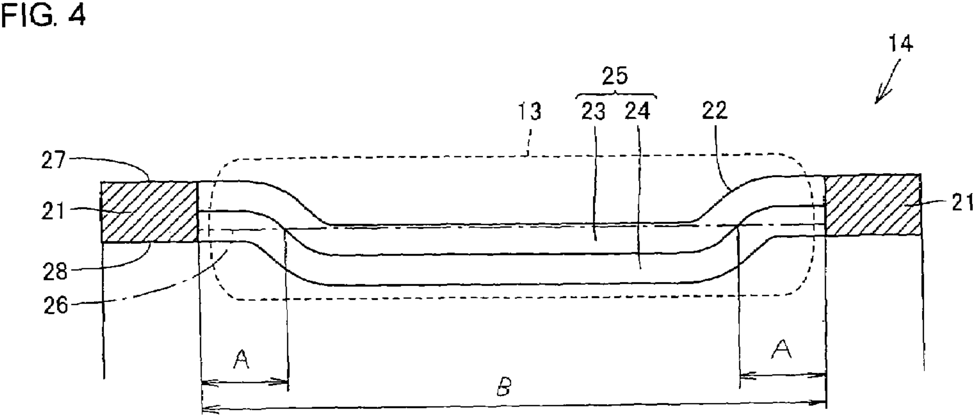
FIG. 4 is a sectional view showing the retainer of the needle roller bearing in an axial direction.

FIG. 4 is a sectional view showing the retainer 14 manufactured by the above manufacturing steps in an axial direction. Referring to FIG. 4, a dotted line designates the needle roller 13 held in the pocket of the retainer 14 and a one-dot chain line designates a PCD 26. In addition, a configuration curve 32 of the sidewall surface 25 in the PCD 26 in this case and an outline 31 of the needle roller 13 are shown together in FIG. 5.

Referring to FIGS. 4 ad 5, a pillar part 22 is pressed so that its sectional configuration becomes V shape toward an inner diameter surface 28 in the above pressing step. Therefore, the center of the pillar part 22 is positioned on the side of the inner diameter surface 28 with respect to the annular part 21.

In addition, since the pocket is punched out with the blade edge of the punch pressed from an outer diameter surface 27 at the above pocket punching step, a sheared surface 23 is formed on the side of the outer diameter surface and a fractured surface 24 is formed on the side of the inner diameter surface in the sidewall surface 25 of the pillar part 22. Therefore, along the PCD 26, the sheared surface 23 on the side of the outer diameter surface 27 is positioned in the center of the sidewall surface 25, and the fractured surface 24 on the side of the inner diameter surface 28 is positioned at the ends of the sidewall surface 25.

Here, the configuration curve 32 of the sheared surface 23 positioned in the center of the sidewall surface 25 is smooth and follows the outline 31 of the needle roller 13. Thus, since the center part of the needle roller 13 and the center part of the sidewall surface 25 can be appropriately in contact with each other, the needle roller can be stably guided.

Figure 5:
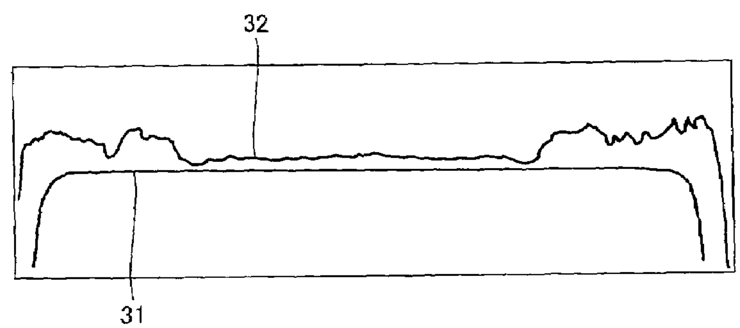
FIG. 5 is a view showing a configuration curve of a sidewall surface along the PCD when a sheared surface is 60% or more, together with an outline of a needle roller.

In addition, it is preferable that a length of the sheared surface in the axial direction that guides the needle roller 13 is not less than 60% of a length of the needle roller 13 in the axial direction. Here, in order to implement that the length of the sheared surface 23 is not less than 60% of the roller length, the band steel may be pressed such that the length of the sheared surface 23 along the PCD 26 become not less than 60% of the roller length at the above pressing step. More specifically, the band steel is pressed and formed into the V shape in the diameter direction such that a dimension of A in FIG. 4, that is, a dimension of the fractured surface on the side of one annular part 21 along the PCD 26 may become not more than 20% of a dimension of B which is a length of the pocket in the axial direction. Referring to FIG. 5, the configuration which is flat and smooth and follows the outline 31 positioned in the center of the configuration curve 32 is not less than 60% of the roller length.

Thus, since the sheared surface 23 which comes in contact with the roller appropriately can be large, the roller movement can be controlled and the needle roller 13 can be guided more stably.

Figure 6:
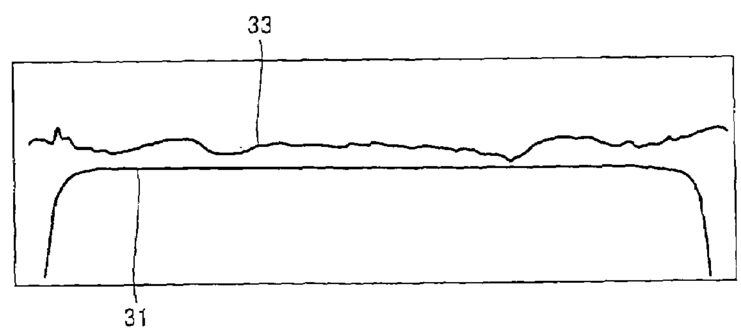
FIG. 6 is a view showing a configuration curve of a sidewall surface of a sample A along the PCD when a sheared surface is 50%, together with the outline of the needle roller.

Here, a test for confirming a seizing resistance property was performed for the needle roller bearing having the retainer in which the length of the sheared surface is not less than 60% of the roller length as shown in FIG. 5 as one embodiment, a needle roller bearing having a retainer whose configuration curve 33 is as shown in FIG. 6 and sheared surface is 50% of a roller length as a sample A, and a needle roller bearing having the conventional retainer as a conventional bearing used in connecting rods.

Test conditions are as follows. The result of this test is shown in Table 1.

Mixture ratio: Gasoline/Lubrication oil=50/1

Operation pattern: Full throttle

Operation time: Two hours or until seizing is found

TABLE 1

Figure 19:
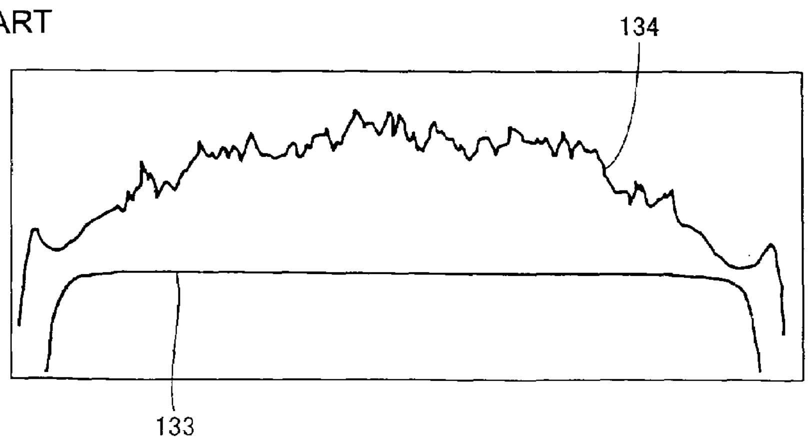
FIG. 19 is a view showing a configuration curve of a sidewall surface of the conventional retainer along the PCD, together with the outline of the needle roller.

| Sample | Test result (number of seizure) | Configuration curve | Length of sheared surface |
|---|---|---|---|
| Inventive example | 0 | FIG. 5 | 60~70% |
| Conventional needle roller bearings | 8 | FIG. 19 | 0~10% |
| Sample A | 6 | FIG. 6 | 45~55% |

Table 1 shows the result of the above test. Referring to Table 1, among the conventional needle roller bearings, eight needle roller bearings were seized out of ten. According to the sample A, six needle roller bearings were seized out of ten. According to the inventive example, no needle roller bearing was seized out of ten.

Therefore, when the length of the sheared surface in the axial direction is not less than 60% of the roller length, since there is no seizing generated, it is enough that the length of the sheared surface in the axial direction is 60% of the roller length.

As described above, when the needle roller bearing having the above constitution is used in the piston pin supporting structure of the 2-cycle engine, there can be provided a piston pin supporting structure of a 2-cycle engine in which a roller is prevented from being skewed and a seizing resistance property is improved. Similarly, when the needle roller baring having the above constitution is used in the crankshaft supporting structure of the 2-cycle engine, there can be provided a crankshaft supporting structure of a 2-cycle engine in which a roller is prevented from being skewed and a seizing resistance property is improved. In addition, by using such piston pin supporting structure of the 2-cycle engine or crankshaft supporting structure of the 2-cycle engine, there an be provided a 2-cycle engine in which a roller is prevented from being skewed and a seizing resistance property is improved.

In addition, although the piston pin supporting structure and the like in the 2-cycle engine has been described in the above embodiment, another engine, a 4-cycle engine, for example may be used.

Furthermore, although the shell type needle roller bearing has been described in the above embodiment, a solid type needle roller bearing may be used. Still furthermore, although the needle roller bearing has been described in the above embodiment, a rod roller bearing, a cylindrical roller bearing and the like may be used.

FIGS. 7 to 13 show another embodiment of the present invention.

Figure 7A:
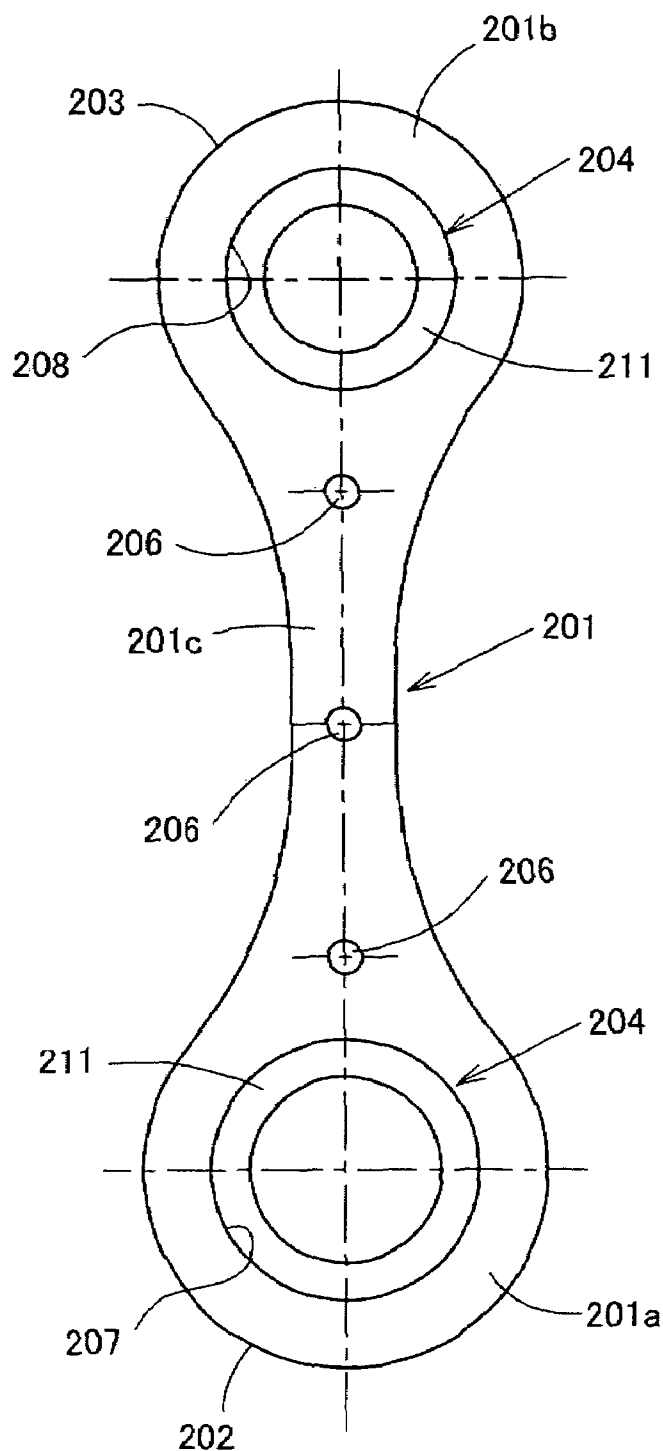
FIG. 7A is a front view showing a connecting rod assembly comprising a shell type roller bearing for a laminated connecting rod according to another embodiment of the present invention.
Figure 7B:
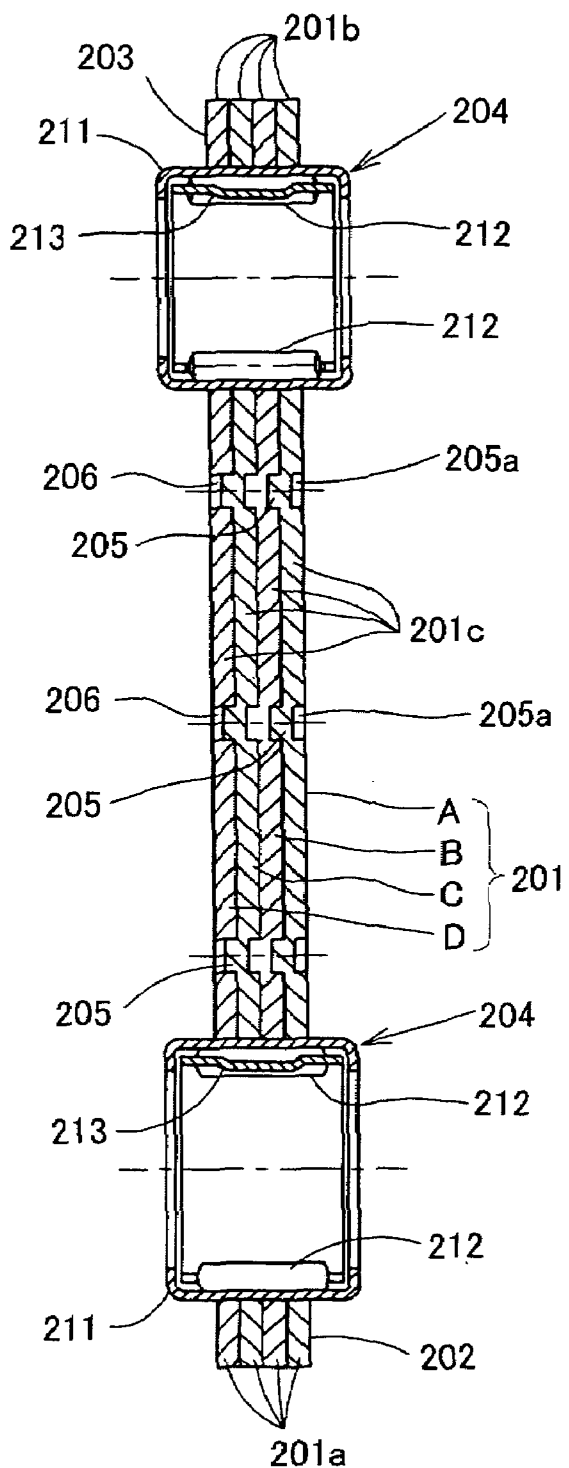
FIG. 7B is a sectional view showing the connecting rod assembly shown in FIG. 7A.

FIGS. 7A and 7B are a sectional view and a front view showing a connecting rod assembly comprising a shell type roller bearing for a laminated connecting rod, respectively according to this embodiment. The connecting rod assembly is used in the 2-cycle engine and especially in a small-size engine, and comprises a laminated connecting rod 201 and shell type roller bearings 204 fitted in a large end 202 and a small end 203 of the laminated connecting rod 201. According to the laminated connecting rod 201, a plurality of (four, here) connecting rod division parts 201A to 201D each having a large end part 201*a*, a small end part 201*b* and a rod part 201*c* are laminated to be integrated.

The connecting rod division parts 201A to 201D are connected by engaging a projection 205 with a recess 205*a* formed on the same plane by a pressing process, or engaging the projection 205 with a through hole 206, and press fitting the engagement. That is, when the projection 205 and the recess 205*a* or the through hole 206 are engaged and press fitted, the connecting rod division parts 201A to 201D are connected to each other. The recess 205*a* is formed on a back side of the projection 205, and the recesses 205*a* in the back surfaces of the projections 205 of the laminated middle connecting rod division parts 201B and 201C engage with the projections 205 of the connecting rod division parts 201A and 201B, respectively. The through hole 206 is formed in the connecting rod division part 201D which is the most outer part with respect to a projecting direction of the projection 205. Although it is enough that the projections 205 or the through hole 206 is provided at one position in the rod part 201*c*, they are provided at three positions apart from each other in the longitudinal direction of the rod according to this embodiment.

Each of the connecting rod division parts 201A to 201D is a flat plate component having the same peripheral configuration, in which bearing engagement holes 207 and 208 are formed at its large end part 201*a* and small end part 201*b*, respectively. The above-described shell type roller bearing 204 is fitted in each of the bearing engagement holes 207 and 208 in a press fitted state. The shell type roller bearings 204 fitted in the large end 202 and the small end 203 of the laminated connecting rod 201 are different in size but they are the same in construction.

Figure 8:
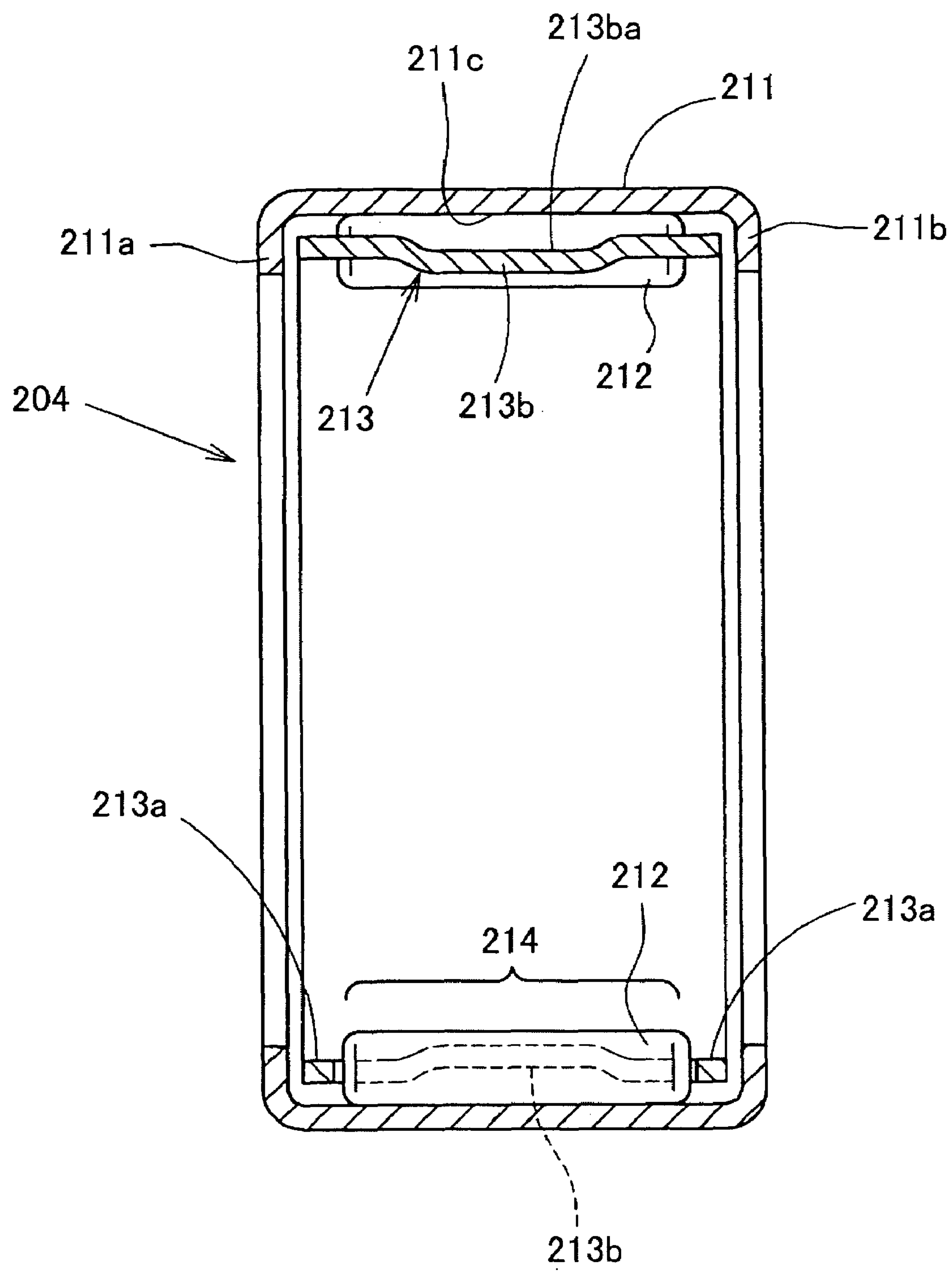
FIG. 8 is an enlarged view showing a shell type roller bearing fitted in the connecting rod assembly.

The shell type roller bearing 204 comprises a cylindrical shell type outer ring 211 formed by a pressing process including a drawing step, a plurality of needle rollers 212 arranged along an inner diameter surface 211*c* of the shell type outer ring 211, and a retainer 213 for retaining these needle rollers 212 rotatably as shown in an enlarged sectional view in FIG. 8. The shell type outer ring 211 has flanges 211*a* and 211*b* bent toward an inner diameter side at both ends.

The retainer 213 is cylindrically formed and a plurality of pockets 214 for housing the needle rollers 212 are provided in a circumferential direction of the retainer 213. The retainer 213 comprises ring-shaped parts 213*a* on both ends and pillar parts 213*b* formed between the pockets 214 adjacent to each other in the circumferential direction and connected to the ring-shaped parts 213*a* on both sides. The ring-shaped parts 213*a* on both sides of the retainer 213 are oppositely disposed on the inner diameter side of the flanges 211*a* and 211*b* of the shell type outer ring 211. The retainer 213 is formed of a steel material and manufactured by a pressing process.

Figure 9:
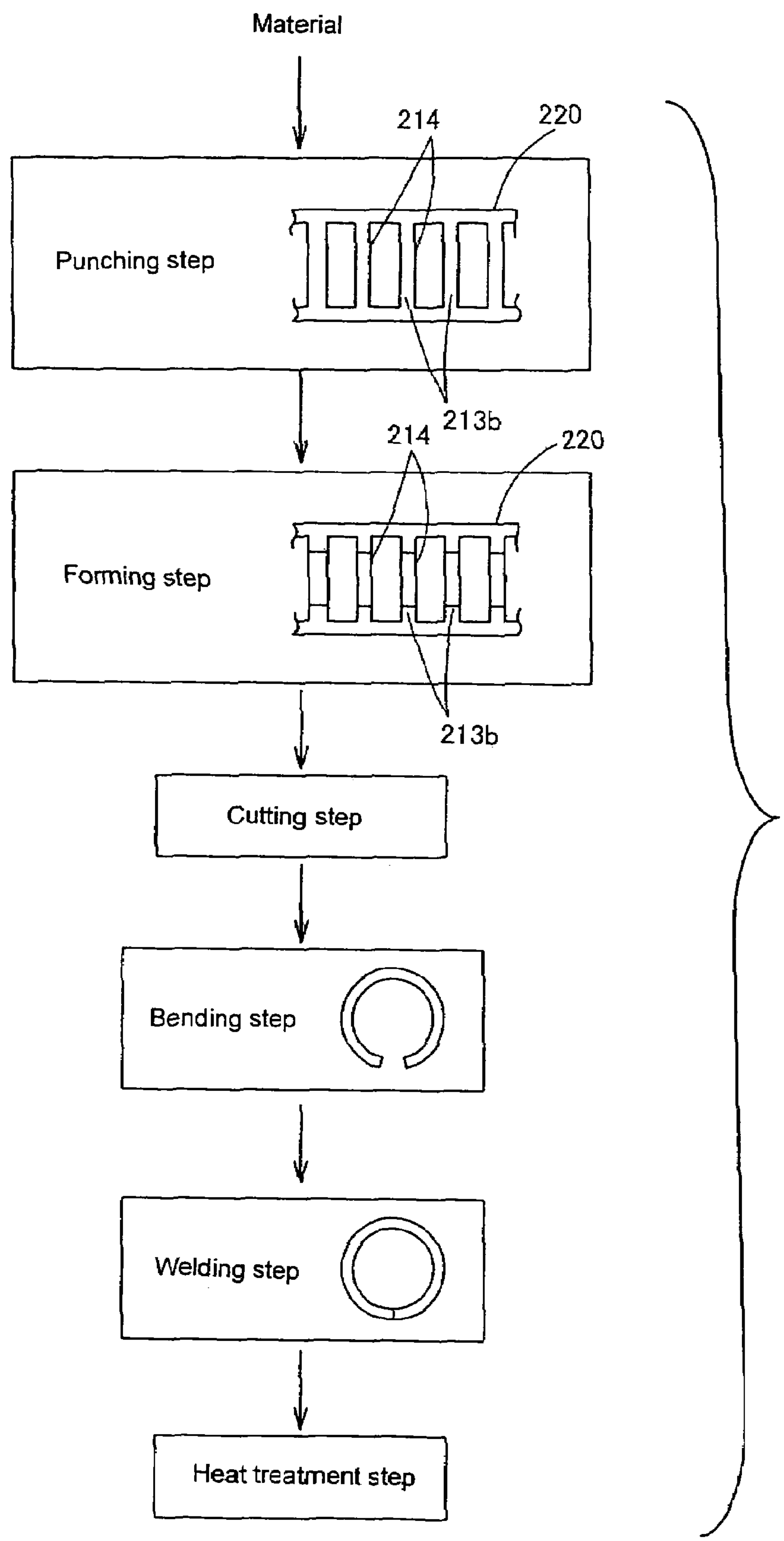
FIG. 9 is a flowchart showing manufacturing steps of a retainer of the shell type roller bearing.
Figure 10:
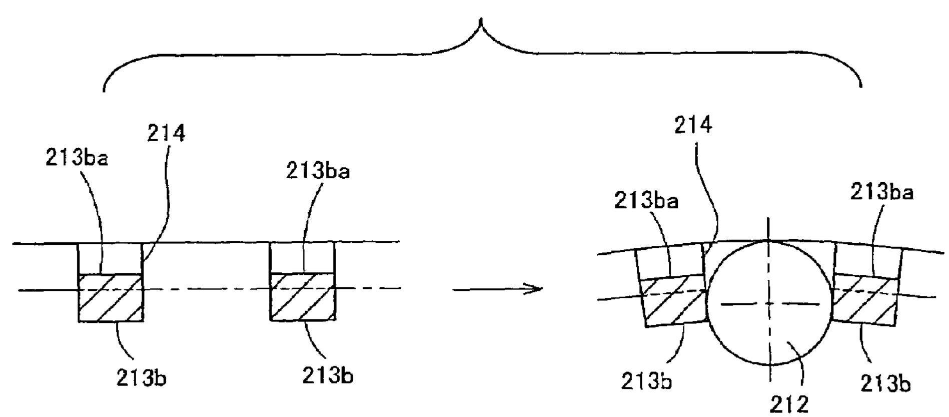
FIG. 10 is an explanatory view for a bending step in the manufacturing steps.

The retainer 213 is manufactured by steps shown in a flowchart schematically shown in FIG. 9 as follows. First, the pockets 214 are punched out from a band steel 220 at a pocket punching-out step using a punch. At the next step, a pillar part 213*b* (in FIG. 8) sandwiched between the adjacent pockets 214 is pressed so that its center part in the longitudinal direction (a middle part of the retainer 213 in a width direction) is recessed in sectional configuration with respect to its both ends. At this time, the pressing is performed from the surface from which the punch was inserted at the pocket punching-out step. Then, the pressed half-finished product is cut to a predetermined length at the next step. At the next step, the cut half-finished product in the form of a band is formed into a cylindrical shape.

Figure 11:
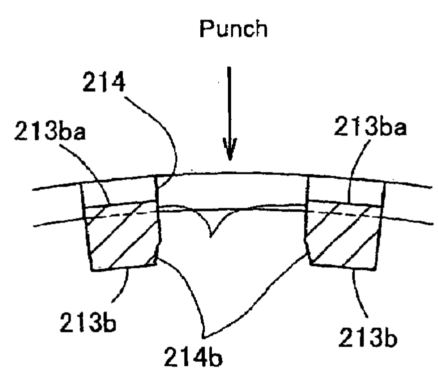
FIG. 11 is an explanatory view showing a side from which a punch is inserted into the retainer.

In this case, the half-finished product is bent and formed into the cylindrical shape such that a recessed part **213*ba* of the middle part of the pillar part 213*b* in the longitudinal direction is provided on an inner diameter side, that is, such that the side from which the punch was inserted at the pocket punching-out step as shown in FIG. 11 becomes its outer circumference. As described in the prior example, the sheared surface is generated on the punch-inserted side and the fractured surface is generated on the opposite side of the punch-inserted side in an inner surface of the pocket 214. Therefore, as described above, a sheared surface 214*a* is generated on the side of the outer circumference and a fractured surface 214*b* is generated on the side of the inner circumference in the inner surface of the pocket 214 in the form of the cylindrical shape as shown in FIG. 11. At the next welding step, both ends of the half-finished cylindrical product in a circumferential direction are bonded to form a ring by welding. Finally, soft nitriding or carburized quenching is performed for the ring-shaped retainer 213** at a heat treatment step.

Figure 12:
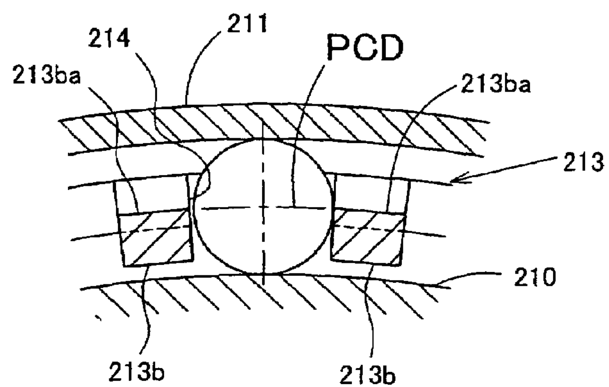
FIG. 12 is a sectional view showing the shell type roller bearing taken along its width direction.
Figure 13:
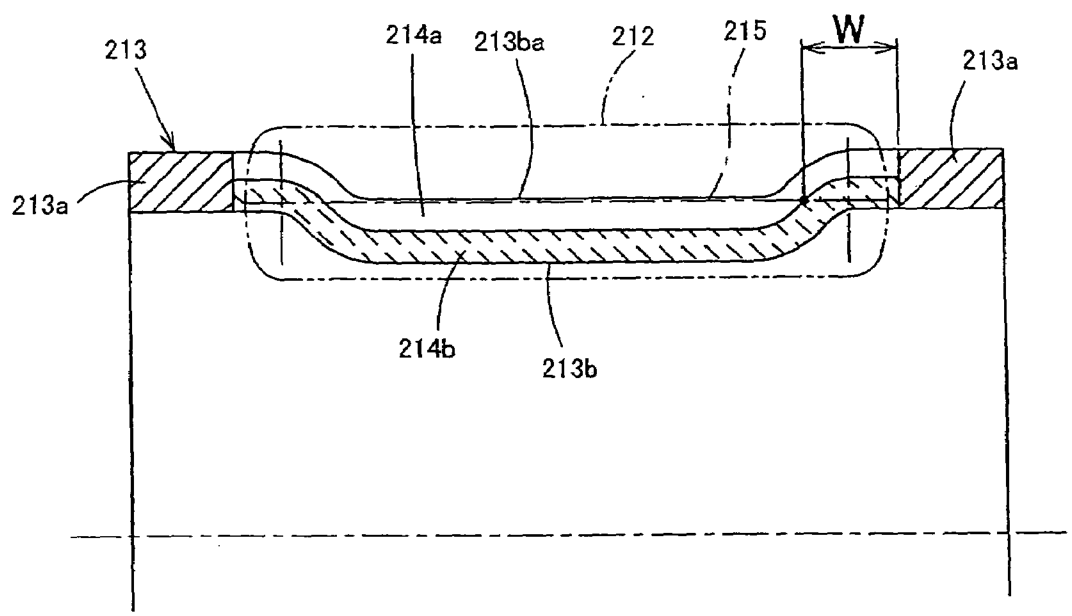
FIG. 13 is a half-enlarged sectional view showing the retainer taken along its width direction.
Figure 14:
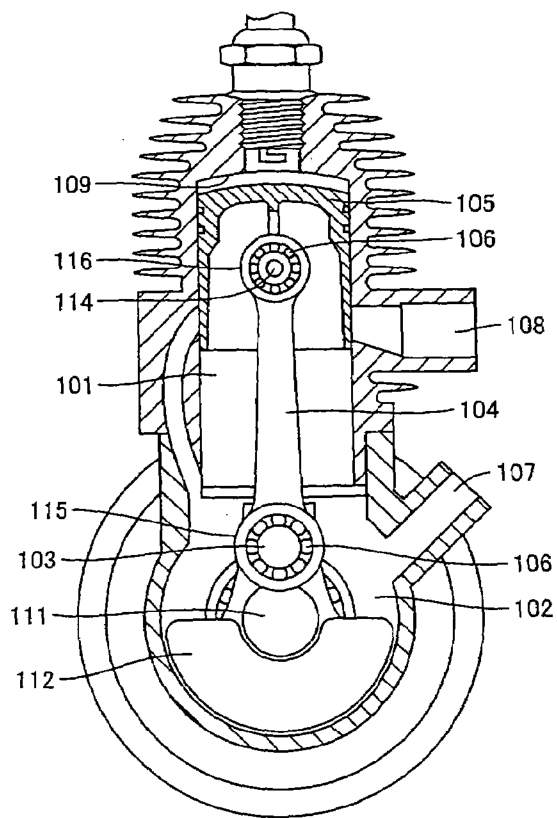
FIG. 14 is a longitudinal sectional view showing a 2-cycle engine in which needle roller bearings are used at a large end part and a small end part of a connecting rod.
Figure 15A:
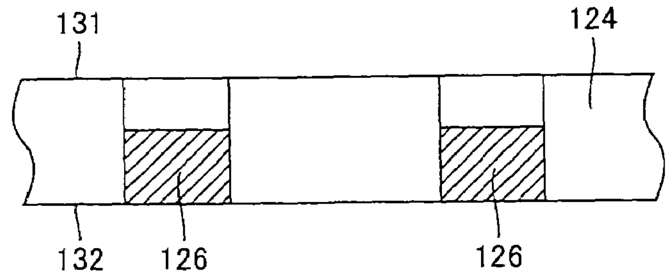
FIG. 15A is a sectional view showing a state before a material of the retainer, a band steel, is formed into a cylindrical shape taken along its diameter direction.
Figure 15B:
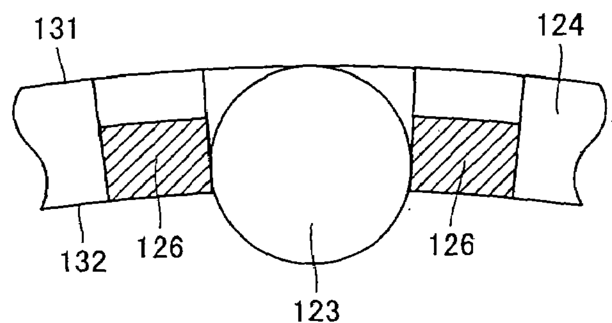
FIG. 15B is a sectional view showing a state after the band steel is bent and formed into the cylindrical shape taken along its diameter direction.
Figure 16:
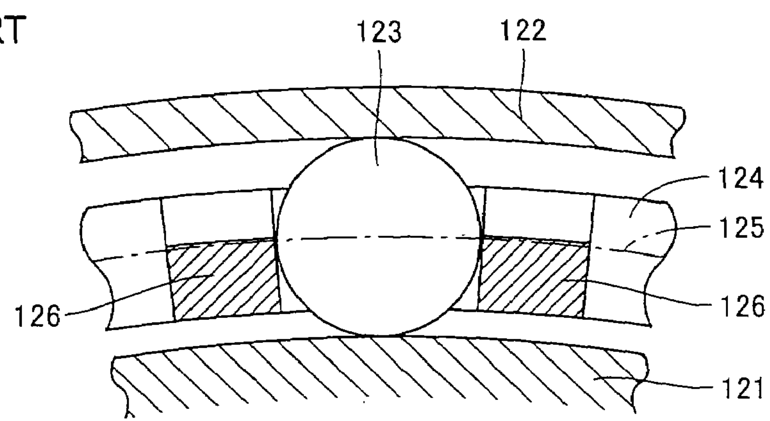
FIG. 16 is a view showing a state in which a needle roller is held in a pocket of the retainer that is formed into a V shape in section by a pressing process.
Figure 17:
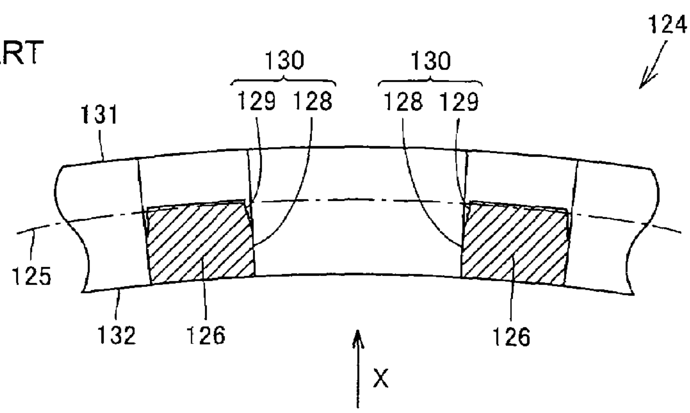
FIG. 17 is a sectional view showing a state in which a sheared surface is positioned on the side of an inner diameter surface and a fractured surface is positioned on the side of an outer diameter surface in a conventional retainer taken along its diameter direction.
Figure 18:
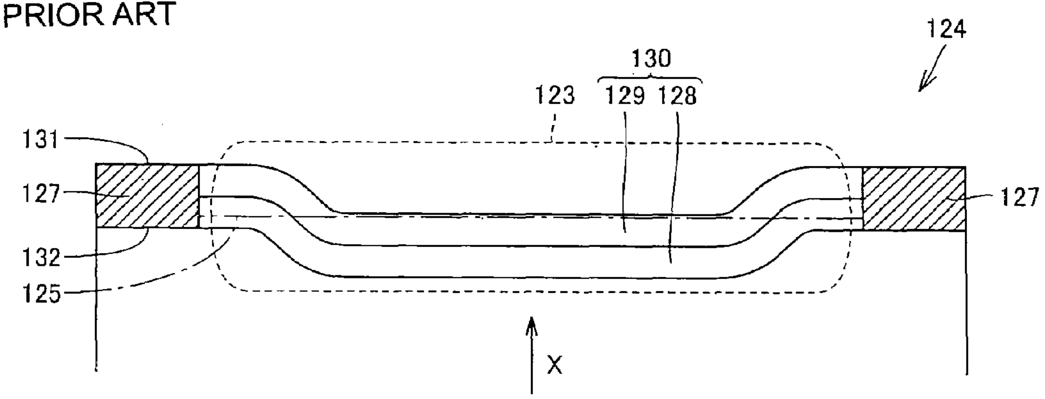
FIG. 18 is a sectional view showing a state in which a sheared surface is positioned on the side of an inner diameter surface and a fractured surface is positioned on the side of an outer diameter surface in the conventional retainer taken along its axial direction.

FIG. 12 is a sectional view showing a state in which a shaft 210 is inserted into the shell type roller bearing 204 and FIG. 13 is a partially enlarged sectional view showing the pocket 214 in the retainer 13, which is cut in the width direction of the retainer. In addition, in FIG. 13, the needle roller 212 is shown by a two-dot chain line. A part of the PCD (FIG. 12) along which the needle rollers 212 are arranged in the longitudinal direction of the inner surface of the pocket 214 is shown by a line 215 in FIG. 13. As described above, in the inner surface of the pocket 214 in the longitudinal direction in FIG. 13, a part on the outer circumference side shown by an outline part is the sheared surface **214*a* and a part on the inner circumference side shown by dashed lines is the fractured surface 214*b*. That is, in the line (215) of the PCD along which the needle rollers 212 are arranged in the longitudinal direction of the inner surface of the pocket 214, the sheared surface 214*a* is formed in the vicinity of the center of the pillar part 213*b* in the longitudinal direction and the fractured surface 214*b*** is formed at roots, that is, on both ends thereof in the longitudinal direction.

According to this embodiment, a length of the sheared surface **214*a* in the longitudinal direction in the vicinity of the center of the pillar part 213*b*, that is, the recessed part 213*ba* is set so as to be not less than 60% of a length of the needle roller 212. In addition, a length of the sheared surface 214*a* in a diameter direction is adjusted so that a length W from an end of the pocket to an intersection point between the sheared surface 214*a* and the line 215** on the PCD may be not more than 20% of the roller length.

According to the shell type roller bearing 204 having this constitution, in the part (line 215) of the PCD along which the needle roller 212 of the retainer 213 is arranged, the sheared surface **214*a* is generated in the vicinity of the center of the pillar part 213*b* in the longitudinal direction and the fractured surface 214*b* is formed at the root parts, that is, at both ends thereof in the longitudinal direction. Therefore, since the needle roller 212 and the retainer 213 are in contact with each other in the vicinity of the center of the pillar part 213*b* in the longitudinal direction during operation, the needle roller 212 does not in contact with the fractured surface 214*b* at the roots of the pillar part 213*b*, in which fracture was generated at the pocket-punching step. Therefore, the needle roller 212 can come in contact with the retainer 213 stably, the needle roller 212 is prevented from being skewed and transversely running in a thrust direction. Thus, when the shell type roller bearing 204 is used in the connecting rod assembly for the 2-cycle engine as shown in FIG. 7, a width surface of the shell type outer ring 211** is prevented from coming in contact with an opponent part of the engine, so that seizing of the bearing can be prevented.

When the sheared surface **214*a* in the vicinity of the center of the pillar part 213*b* of the retainer in the longitudinal direction becomes short and the length of the contact part between the needle roller 212 and the sheared surface 214*a* of the retainer 213 having the above constitution becomes short, the movement of the needle roller 212 cannot be sufficiently controlled. However, according to this embodiment, since the length of the sheared surface 214*a* in the vicinity of the center of the pillar part 213*b* in the longitudinal direction, that is, the length of the recessed part 213*ba* is provided so as to be not less than 60% of the length of the needle roller 212, the contact part between the needle roller 212 and the sheared surface 214*a* is long, so that the movement of the needle roller 212** can be stabled.

Furthermore, according to this embodiment, since the shell roller bearing 204 having the above constitution is press fitted in the bearing engagement hole 207 or 208 in the large end 202 or the small end 203 (both large end 202 and small end 203 in the embodiment) in the laminated connecting rod 201 to constitute the connecting rod assembly, other than the above effect provided by the shell type roller bearing 204, there is provided the following effect.

That is, even when an inner diameter surface of the large end part **201*a* or the small end part 201*b* in each of the connecting rod division parts 201A to 201D was skewed due to the pressing process, skew of an inner diameter surface of the large end 202 or the small end 203 of the laminated connecting rod 201 can be eliminated. For example, when each of the connecting rod division parts 201A to 201D is normally pressed out, the large end part 201*a* or the small end part 201*b* is skewed because of its fractured surface. However, since each thickness is small because of division, a level difference between a sheared surface and a fractured surface is small, so that the fractured surfaces are dispersed when laminated. Thus, skew of the inner diameter surface of the large end 202 or the small end 203 can be eliminated as a whole of the laminated connecting rod 201. Therefore, when the shell type roller bearings 204 are press fitted in the large end 202 and the small end 203, the outer ring 211 is not skewed. Thus, since pressed-out product can be used for the connecting rod division parts 201A to 201D, it is not necessary to perform a post-process such as grinding or polishing for the large end part 201*a* and the small end part 201*b***.

Furthermore, since the laminated connecting rod division parts 201A to 201D are connected by engaging the connecting projection 205 formed by pressing the rod part **201*c* with the recess 205*a* formed on the back surface of the projection 205, or with the through hole 206 formed separately from the projection 205, they can be rigidly connected. Since the laminated connecting rod division parts 201A to 201D are connected by means of the projection 205 and the recess 205*a* and the like at the rod part 201*c*, bending strength and buckling strength at the rod part 201 are improved. Since the projection 205 and the recess 205*a*** formed on the back surface thereof are provided by the pressing process, they can be easily formed.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. A needle roller bearing comprising:

a plurality of needle rollers; and a retainer for retaining said needle rollers, wherein said retainer includes a pair of annular parts and pillar parts connecting said pair of annular parts so as to form pockets in which said needle rollers are housed, a sidewall surface of said pillar part has a sheared surface punched by a punching blade so that said pockets are formed, and a fractured surface fractured by a material pressed by the punching blade, and said needle roller is guided by said sheared surface, wherein said pillar part has a configuration in which its center part is recessed toward the inside in a diameter direction from its end parts connected to said annular parts, and wherein said sheared surface is positioned on the outside in the diameter direction of said end parts and said center part, said fractured surface being positioned on the inside in the diameter direction of said end parts and said center part, and a length in an axial direction of said sheared surface that is positioned on a pitch circle diameter and guides the needle roller is not less than 60% of a length in the axial direction of the needle roller.

2. A piston supporting structure of an engine provided with the needle roller bearing according to claim 1, comprising:

a piston;

a connecting rod for converting a linear movement to a rotary motion; and a piston pin for connecting said piston to a small end part of said connecting rod, wherein said needle roller bearing is incorporated in an end part of said connecting rod to support said piston pin rotatably.

3. A 2-cycle engine comprising the piston pin supporting structure according to claim 2.

4. A crankshaft supporting structure of an engine provided with the needle roller bearing according to claim 1, comprising:

a crankshaft for outputting a rotary motion; and a connecting rod for converting a linear reciprocating movement to a rotary motion, wherein said needle roller bearing is incorporated in an end part of said connecting rod to support said crankshaft rotatably.

5. A 2-cycle engine comprising the crankshaft supporting structure according to claim 4.

6. A connecting rod assembly comprising:

a laminated connecting rod laminated with plate-shaped connecting rod division parts having a large end part, a small end part and a rod part individually and connected to the adjacent connecting rod division part by engaging a connecting projection formed in said rod part by a pressing process with a recess formed on a back surface of the projection or with a through hole formed separately from said projection; and a shell type roller bearing having an outer ring, a plurality of needle rollers and a retainer for retaining the plurality of needle rollers, in which said outer ring is press fitted in a bearing engagement hole in a large end or a small end of said laminated connecting rod, wherein said retainer of said shell type roller bearing has a sectional configuration in which its center part in a width direction is recessed toward an inner diameter side with respect to its both ends, said retainer comprises a plurality of pockets provided in a circumferential direction, and pillar parts positioned between said adjacent pockets; and a part positioned on a pitch circle diameter along which the needle roller is arranged in an inner surface of said pocket in a longitudinal direction consists of a sheared surface in the vicinity of the center of said pillar part in the longitudinal direction and a fractured surface at root parts thereof, wherein said pillar part has a configuration in which its center part is recessed toward the inside in a diameter direction from its end parts connected to said annular parts, and wherein said sheared surface is positioned on the outside in the diameter direction of said end parts and said center part, said fractured surface being positioned on the inside in the diameter direction of said end parts and said center part, and a length in an axial direction of said sheared surface that is positioned on a pitch circle diameter and guides the needle roller is not less than 60% of a length in the axial direction of the needle roller.

7. A retainer of a needle roller bearing for retaining a plurality of needle rollers, comprising:

a pair of annular parts and pillar parts connecting said pair of annular parts so as to form pockets in which said needle rollers are housed, wherein said pillar part has a configuration in which its center part is recessed toward the inside in a diameter direction, and a sidewall surface of said pillar part has a sheared surface punched by a punching blade so that said pockets are formed, on the outside in a diameter direction, and a fractured surface fractured by a material pressed by the punching blade, on the inside in the diameter direction, wherein said pillar part has a configuration in which its center part is recessed toward the inside in a diameter direction from its end parts connected to said annular parts, and wherein said sheared surface is positioned on the outside in the diameter direction of said end parts and said center part, said fractured surface being positioned on the inside in the diameter direction of said end parts and said center part, and a length in an axial direction of said sheared surface that is positioned on a pitch control diameter and guides the needle roller is not less than 60% of a length in the axial direction of the needle roller.

* * * * *